(12) United States Patent
Braun

(10) Patent No.: US 9,989,016 B2
(45) Date of Patent: Jun. 5, 2018

(54) ELECTRONIC CONTROLLED FUEL ENRICHMENT SYSTEM

(71) Applicant: WALBRO ENGINE MANAGEMENT, L.L.C., Tucson, AZ (US)

(72) Inventor: Matthew A. Braun, Caro, MI (US)

(73) Assignee: Walbro LLC, Tucson, AZ (US)

( * ) Notice: Subject to any disclaimer, the term of this patent is extended or adjusted under 35 U.S.C. 154(b) by 0 days. days.

(21) Appl. No.: 14/773,955

(22) PCT Filed: Mar. 6, 2014

(86) PCT No.: PCT/US2014/021095
§ 371 (c)(1),
(2) Date: Sep. 9, 2015

(87) PCT Pub. No.: WO2014/158957
PCT Pub. Date: Oct. 2, 2014

(65) Prior Publication Data
US 2016/0040628 A1 Feb. 11, 2016

Related U.S. Application Data

(60) Provisional application No. 61/785,744, filed on Mar. 14, 2013.

(51) Int. Cl.
*F02M 17/38* (2006.01)
*F02M 7/10* (2006.01)
(Continued)

(52) U.S. Cl.
CPC .............. *F02M 17/38* (2013.01); *F02M 7/10* (2013.01); *F02M 17/04* (2013.01); *F02M 17/10* (2013.01);
(Continued)

(58) Field of Classification Search
CPC ........ F02M 17/00; F02M 17/02; F02M 17/04; F02M 17/08; F02M 17/10; F02M 17/34;
(Continued)

(56) References Cited

U.S. PATENT DOCUMENTS 2,775,435 A * 12/1956 Kommer .................. F02M 7/08
261/34.2
3,921,612 A 11/1975 Aono
(Continued)

FOREIGN PATENT DOCUMENTS

| GB | 2207467 A | 2/1989 | |
|---|---|---|---|
| JP | 62150049 A | * 7/1987 | ............. F02D 41/34 |
| JP | H11324800 A | 11/1999 | |

OTHER PUBLICATIONS

Written Opinion & International Search Report for PCT/US2014/021095 dated Jun. 20, 2014, 12 pages.
(Continued)

*Primary Examiner* — Sizo Vilakazi
*Assistant Examiner* — Kevin R Steckbauer
(74) *Attorney, Agent, or Firm* — Reising Ethington P.C.

(57) ABSTRACT

An apparatus for delivering a fuel-air mixture to an engine is provided. The apparatus includes: a carburetor having one or more passages and one or more chambers, wherein at least some of the passages and chambers are in communication with one another; and a fluid pump communicated with the carburetor and pumping fluid into or out of the carburetor to influence an fuel-to-air ratio of a fuel and air mixture delivered from the carburetor.

15 Claims, 3 Drawing Sheets

(51) Int. Cl.
*F02M 17/04* (2006.01)
*F02M 17/10* (2006.01)
*F02M 17/34* (2006.01)
*F02M 17/42* (2006.01)
*G05D 11/13* (2006.01)
*F02M 1/16* (2006.01)
*F02M 17/08* (2006.01)

(52) U.S. Cl.
CPC ............ F02M 17/34 (2013.01); F02M 17/42 (2013.01); G05D 11/13 (2013.01); *F02M 1/16* (2013.01); *F02M 17/08* (2013.01)

(58) Field of Classification Search
CPC .......... F02M 17/38; F02M 17/42; F02M 1/16; F02M 7/10
See application file for complete search history.

(56) References Cited

U.S. PATENT DOCUMENTS

| | | | | |
|---|---|---|---|---|
| 4,034,730 | A * | 7/1977 | Ayres | F02D 41/3082 |
| | | | | 123/499 |
| 4,116,177 | A * | 9/1978 | Whatley, Jr. | F02M 17/26 |
| | | | | 123/452 |
| 4,425,892 | A | 1/1984 | Firey | |
| 4,726,342 | A * | 2/1988 | Diener | F02D 35/0053 |
| | | | | 123/438 |
| 4,848,290 | A * | 7/1989 | Miller | F02M 1/16 |
| | | | | 123/179.11 |
| 4,862,847 | A * | 9/1989 | Kobayashi | F02M 1/16 |
| | | | | 123/179.14 |
| 4,862,848 | A * | 9/1989 | Kobayashi | F02M 1/16 |
| | | | | 123/179.9 |
| 4,905,641 | A * | 3/1990 | Miller | F02M 1/16 |
| | | | | 123/179.11 |
| 4,971,013 | A * | 11/1990 | Muraji | F02M 69/20 |
| | | | | 123/452 |
| 4,986,240 | A * | 1/1991 | Muraji | F02M 69/20 |
| | | | | 123/452 |
| 5,345,912 | A * | 9/1994 | Svensson | F02D 35/0053 |
| | | | | 123/438 |
| 5,709,193 | A * | 1/1998 | Svensson | F02D 31/007 |
| | | | | 123/333 |
| 6,581,916 | B1 | 6/2003 | Shaw | |
| 6,715,737 | B2 | 4/2004 | Galka et al. | |
| 7,309,061 | B2 * | 12/2007 | Araki | F02M 17/04 |
| | | | | 261/35 |
| 8,240,292 | B1 | 8/2012 | Roche et al. | |
| 9,062,630 | B2 * | 6/2015 | Kus | F02M 1/18 |
| 9,068,545 | B2 * | 6/2015 | Gorenflo | F02P 1/086 |
| 2007/0013085 | A1 * | 1/2007 | Araki | F02M 17/04 |
| | | | | 261/35 |
| 2008/0163841 | A1 | 7/2008 | Gliniecki et al. | |
| 2008/0302332 | A1 | 12/2008 | Dow et al. | |
| 2011/0146611 | A1 * | 6/2011 | Gorenflo | F02N 3/02 |
| | | | | 123/179.28 |
| 2013/0175713 | A1 * | 7/2013 | Kus | F02M 1/18 |
| | | | | 261/36.2 |
| 2015/0184616 | A1 * | 7/2015 | Bostian | F02M 7/00 |
| | | | | 261/27 |

OTHER PUBLICATIONS

First Office Action in Corresponding Swedish Patent Application No. 1551273-4, dated Oct. 20, 2016, 6 pages.

* cited by examiner

ELECTRONIC CONTROLLED FUEL ENRICHMENT SYSTEM

REFERENCE TO CO-PENDING APPLICATION

This application claims the benefit of U.S. Provisional Application No. 61/785,744 filed Mar. 14, 2013, which is incorporated herein by reference in its entirety.

TECHNICAL FIELD

The present disclosure relates generally to carburetors, and more particularly to a fluid pump for a carburetor.

BACKGROUND

Fuel systems for combustion engines can sometimes include a carburetor for delivering a combination of fuel and air to an engine. The carburetor may be configured to control the volume of air and fuel according to a predetermined ratio.

SUMMARY

According to one implementation of the disclosure, there is provided an apparatus for delivering a fuel-air mixture to an engine. The apparatus includes: a carburetor having one or more passages and one or more chambers, wherein at least some of the passages and chambers are in communication with one another; and a fluid pump communicated with the carburetor and pumping fluid into or out of the carburetor to influence an fuel-to-air ratio of a fuel and air mixture delivered from the carburetor.

According to another implementation of the disclosure, there is provided a system for delivering a fuel-air mixture to an engine. The system includes: a carburetor having one or more passages and one or more chambers, wherein at least some of the passages and chambers are in communication with one another; a fluid pump having an orifice for communicating with the carburetor to influence a fuel-to-air ratio of a fuel and air mixture delivered from the carburetor; and a controller for regulating the fluid pump.

According to another implementation of the disclosure, there is provided a method of controlling the air-fuel mixture in a carburetor. The method includes the steps of: receiving at least one fluid into one of a passage or a chamber of a carburetor; and influencing the pressure of the at least one fluid in the passage or chamber using a fluid pump in communication with the passage or chamber, whereby by influencing the pressure, the fuel-to-air ratio of a fuel and air mixture delivered by the carburetor is altered.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
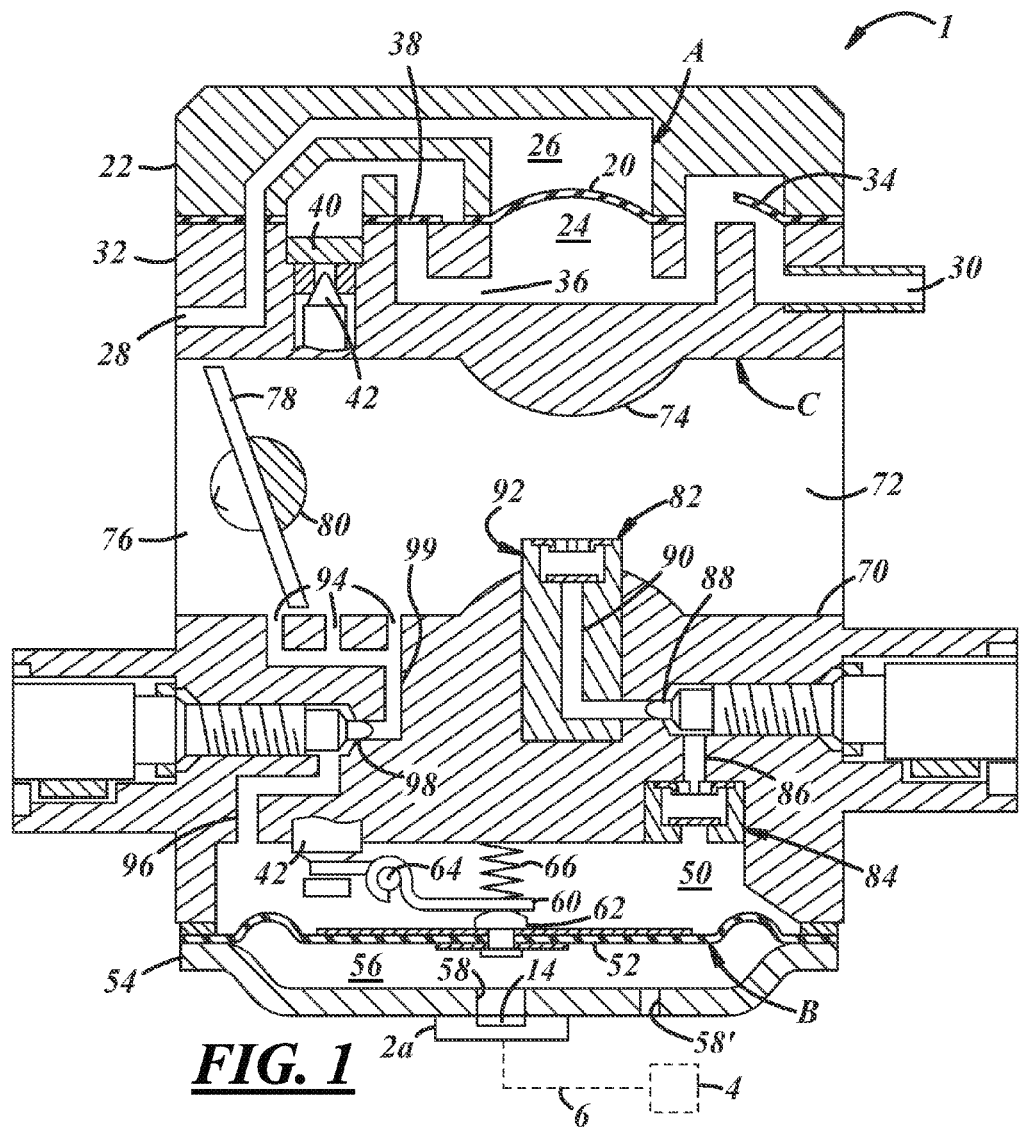
FIG. 1 is a partial sectional view of one implementation of a carburetor.

Referring in more detail to the drawings, FIG. 1 illustrates one embodiment of a diaphragm type carburetor 1 having a fluid pump 2a for displacing a liquid, a gas, or any combination thereof for an internal combustion gasoline fueled engine. The carburetor 1 may be used, for example, in a small general-purpose internal combustion engine. The diaphragm carburetor 1 may include a fuel pump assembly A and a fuel metering system B, and a mixing assembly C, and A, B, and C may provide a fuel circuit for carrying air, fuel, or both therethrough. The fluid pump 2a may communicate with various passages and chambers of the assembly A, the system B, and the assembly C. The fuel pump assembly A, the fuel metering system B, and the mixing assembly C, if desired, may be of conventional construction. In one implementation, the carburetor 1 may be a butterfly valve type carburetor, although other carburetor types may also be used.

When the engine is operating, the fuel pump assembly A supplies fuel to the metering system B of the carburetor 1. The fuel pump assembly A may have a flexible diaphragm or membrane 20 received and sealed between an upper face of a carburetor main body 32 and a lower face of an upper cover 22 and defining in part a fuel pump chamber 24 and a pressure pulse chamber 26 to which pressure and vacuum pulses in the crankcase of an operating engine are introduced through a passage 28 to displace or actuate the diaphragm 20. The fuel pump chamber 24 communicates with an external fuel tank (not shown) via an inlet passage 30; the inlet passage 30 may be formed in a main body 32 of the carburetor and may have a one-way check valve 34. The pump chamber 24 also communicates with the fuel metering system through an outlet passage 36, a one-way check valve 38, a screen 40, and a flow control or inlet valve 42. A fuel-intake movement of the pump diaphragm 20 in a direction increasing the volume of the pump chamber 24 causes the check valve 38 to close and the check valve 34 to open and to thereby allow fuel to be drawn into the pump chamber 24 from the fuel tank. A fuel expelling movement of the pump diaphragm 20 in a direction decreasing the pump chamber volume may cause the check valve 38 to open and the check valve 34 to close and thereby force the fuel from the pump chamber 24 into a fuel metering chamber 50 of the fuel metering system B through which fuel is supplied to the fuel mixing assembly C within the carburetor.

The fuel metering system B may have a flexible diaphragm or membrane 52 and may be sealed between a lower face of the carburetor body 32 and a lower cover 54. The diaphragm 52 may define the fuel metering chamber 50 on one side of the diaphragm 52 and a reference chamber 56 on the other side; the reference chamber 56 may be isolated from the fuel circuit and in communication with the atmosphere, the engine, and/or various other chambers and/or passages via one or more ports 58 (and optional port 58) on the lower cover 54. The inlet valve 42 may be opened and closed to control the admission of fuel to chamber 50 by movement of the diaphragm 52 which is operably coupled to the valve 42 by a lever 60. At one end, the lever 60 may be connected to the inlet valve 42, and at the other end the lever 60 may bear on a projection 62 attached to the center of the diaphragm 52. The illustrated lever 60 is rotatably supported by a pivot shaft 64 and yieldably biased by a spring 66 bearing on the lever 60 to bias the inlet valve 42 to its closed position. In one implementation, the lever 60 is resiliently urged in the direction to abut an end of the lever 60 against projection 62.

When the pressure in the reference chamber 56 is higher than the pressure in the fuel metering chamber 50 to such an extent that the diaphragm 52 is displaced in a direction reducing the volume of the fuel metering chamber 50, the projection 62 pushes on and moves the lever 60 about its pivot 64. The resulting counter-clockwise rotation of the lever 60 opens the inlet valve 42 (i.e., the counter-clockwise rotation with respect to the figures shown), and fuel then flows into the fuel metering chamber 50.

The mixing assembly C receives fuel from the metering chamber 50 (within the metering system B) and mixes air with the fuel. The mixing assembly C includes a main passage or air and fuel mixing intake bore 70 with an air inlet 72, a restricted section 74 (e.g., a venturi passage) downstream of the inlet 72, and an outlet 76 downstream of the restricted section 74 which communicates with the engine. A throttle valve head 78 is received in the intake bore 70 downstream of the restricted section 74 and is mounted on a throttle valve shaft 80 extending transversely through the bore and journalled for rotation in the carburetor body 32.

Fuel in the metering chamber 50 is available for delivery to the intake bore 70 via a check valve 84, a fuel passage 86, a fuel metering needle valve 88, a fuel passage 90, a check valve 92, and a main fuel nozzle 82 (i.e., fuel is available for delivery to the mixing assembly C). Fuel is also supplied from the metering chamber 50 to a series of low speed fuel nozzles or ports 94 which may open into the intake bore 70 both upstream and downstream of the throttle valve 78 in its idle or closed position, via a fuel passage 96, an adjustable low speed fuel regulating needle valve 98, and a fuel passage 99.

In operation, a pressure drop is created by air flowing through the intake bore 70 towards the engine. The pressure drop may cause fuel to flow: through the low speed ports 94 into the intake bore 70 under idle and near idle operating conditions, and through the main fuel nozzle 82 into the intake bore 70 under near idle to wide open throttle operating conditions.

In the implementation shown in FIG. 1, a fluid pump 2a is shown in communication with the reference chamber 56 via the port 58. The fluid pump 2a may have an outlet 14 through which fluid is discharged into the reference chamber 56 to vary the instantaneous pressure therein. Thus, in some implementations, the fluid pump 2a may increase the volume within the reference chamber 56 and thereby increase the pressure within the fuel metering chamber 50, contributing to the displacement of the diaphragm 52 and the passage of fuel from the metering chamber 50 to the mixing assembly C. Therefore, the pumping action of the fluid pump 2a into the reference chamber 56 may enrich the fuel-to-air ratio within the mixing assembly C ultimately delivering a richer fuel-air mixture to the engine. This may be desirable, for example, to support engine acceleration, starting and warming up, and high load operation. A richer fuel mixture can also be used to control maximum engine speed (e.g., to prevent an overspeed condition), and for other reasons.

The fluid pump 2a may be any electrically and/or mechanically controlled pumping device. The pump 2a may or may not be micro-sized or miniaturized. In the illustrated implementation, the fluid pump 2a is electronically controlled by an optional controller 4 via a coupling 6 (e.g., that provides power and/or signals). Controllers and various control algorithms and control techniques known to skilled artisans may be implemented to control the fluid pump 2a (e.g., including stop/go actuation, flow rate, duty cycle, etc.). In one example, the control algorithm may be responsive to the instantaneously changing fuel demands of the engine. The optional vent port 58' in the cover 54 may be sized to prevent undue dissipation of a pressure signal in chamber 56.

Figure 2:
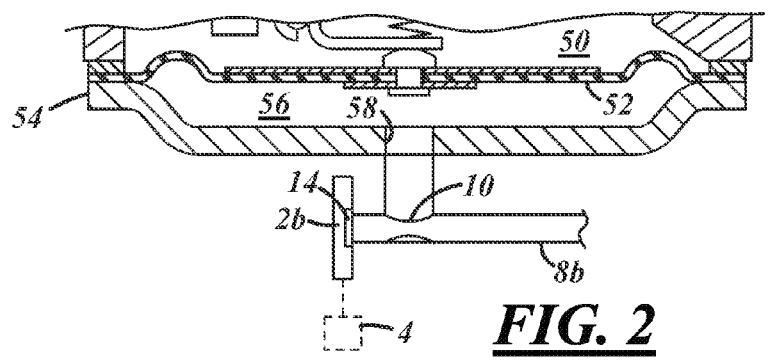
FIG. 2 is a partial sectional view illustrating another implementation of the carburetor of FIG. 1.

In another implementation shown in FIG. 2, a fluid pump 2b is shown in communication with the reference chamber 56 via a passage 8b coupled to the port 58. The passage 8b has a venturi passage or pump 10 downstream of the fluid pump 2b. In operation, the fluid pump may expel a fluid via its outlet 14 into the passage 8b and through the venturi pump 10 to create a pressure drop communicated with the reference chamber 56 via port 58 and thereby reduce the pressure in the chamber 56. Alternatively or in addition, the inlet of the pump could draw in air from the reference chamber 56 and discharge that air outside of the chamber 56 generally and/or through the venturi pump 10. The passage 8b may communicate with the atmosphere and/or various other chambers and/or passages. As the pressure in the reference chamber 56 decreases, the diaphragm 52 may be displaced or inhibited from actuating the valve 42, at least momentarily. Where actuation of the valve 42 is inhibited, the quantity of fuel delivered to the mixing assembly C may be reduced and the fuel-air mixture delivered to the engine may be leaner. A leaner fuel-air mixture may be desirable in many operating conditions, such as to prevent or lessen a rich come-down condition which may occur as an engine is decelerated from high speed to low speed operation. Of course, this is just one example and a leaner fuel-air mixture may be provided at any desired time.

Figure 3:
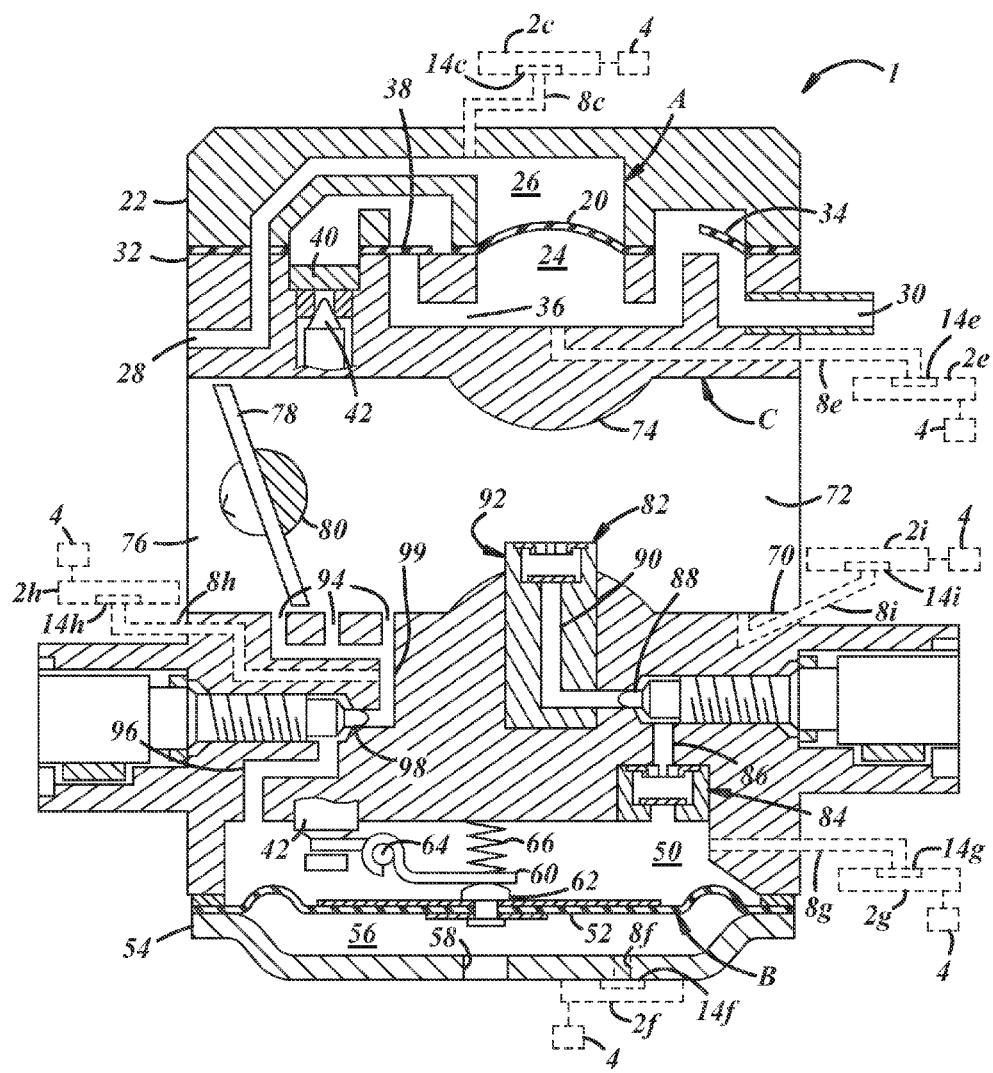
FIG. 3 is a partial sectional view of various other implementations of the carburetor of FIG. 1.

As shown in FIG. 3, various other implementations of the carburetor 1 are also possible where a fluid pump is in communication with other chambers and/or passages of the carburetor. As similarly described with respect to fluid pumps 2a and 2b, the fluid pump(s) shown in FIG. 3 may increase or decrease the volume and/or pressure within the chambers and/or passages with which they respectively communicate and thereby ultimately affect the ratio of the fuel-air mixture delivered to the engine. Similarly, the fluid pump 2c may be in communication with the pressure pulse chamber 26 via passage 8c—increasing or decreasing the pressure within chamber 26. The following additional implementations are provided by way of example (other additional implementations are possible): fluid pump 2e in communication with the pump chamber 24 via passage 8e to pump additional liquid fuel from a fuel line or a fuel tank (not shown) to pump chamber 24; fluid pump 2f in communication with the reference chamber 56 via passage 8f (leaving the port 58 open to the atmosphere or other chambers, passages, etc.); fluid pump 2g in communication with the metering chamber 50 via passage 8g to pump liquid fuel from a fuel line or the fuel tank (not shown); pump 2h in communication with the passage 99 via passage 8h to pump fuel or air into or out of the passage 99 leading to the low speed ports 94 (a similar arrangement could be used to pump fluid to or from the area of the high speed nozzle or port 82); and pump 2i in communication with the intake bore 70 via passage 8i to directly pump fuel and/or air into the air and fuel mixing passage 70, and this may occur anywhere with the passage 70, as desired. In each of the examples, the fluid pumps may be optionally coupled to a controller 4; or in some instances, each pump may be associated with its own controller. In addition, the use of more than one fluid pump 2 at the carburetor 1 is also possible. The illustrated fluid pumps 2 (i.e., 2a, 2b, 2c, 2d, 2e, 2f, 2g, 2h, 2i, etc.) are merely illustrative and other implementations are also possible. It should be appreciated that in all these instances, the fluid pump(s) 2 may pump a liquid, a gas, or combination thereof; examples include liquid fuel pumps or air pumps.

Figure 4:
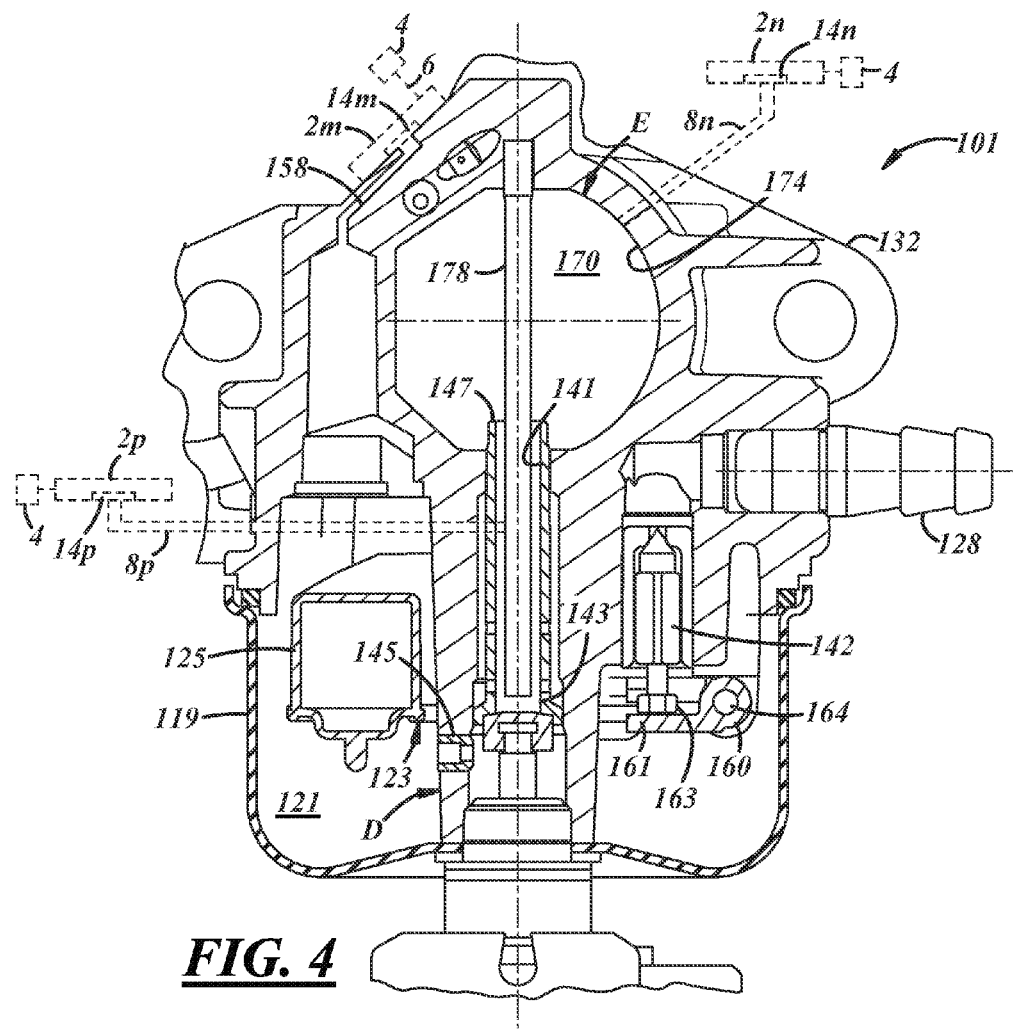
FIG. 4 is a partial sectional view of another implementation of a carburetor.

As previously described, the present disclosure is not limited to diaphragm carburetors. FIG. 4 illustrates a float bowl carburetor 101 that may optionally have a pump 2 in fluid communication with one or more of its passages and chambers. As described hereafter, the carburetor 101 may have a fuel metering system D and a mixing assembly E.

A main body 132 of the carburetor 101 may have a fuel inlet 128 that provides fuel to the metering system D via an inlet valve 142 having a valve member on one end and a projection 163 on the other. The fuel metering system D may include a float bowl 119 coupled to the lower portion of the main body 132 defining a fuel cavity 121, a float assembly 123 having a float 125 sized to freely move up and down within the bowl 119, and a central passage 141 for delivering fuel from the float bowl 119 to the mixing assembly E. The float assembly 123 may be coupled to a lever arm 160 at a distal end 161 and at the other end, the lever arm may be fixedly connected to the main body 132 by a shaft 164 about which the lever arm 160 may rotate. The distal end 161 of the lever arm 160 may also contact the projection 163 of the inlet valve 142. The fuel cavity 121 may be in communication with the atmosphere via one or more passages 158 within the main body 132 of the carburetor 101. One end 143 of the central passage 141 may be in communication with the fuel cavity 121 via an inlet 145 and the other end 147 may be open to the mixing assembly E which includes a main bore or intake passage 170.

The mixing assembly E may further include a shaft 178 to rotatably carry a throttle valve (not shown) within the intake passage 170 for controlling the flow of fuel and air to the engine.

As will be appreciated by skilled artisans, in operation, the engine draws fuel and air therein via the intake passage 170 decreasing the pressure therein. The pressure within the fuel cavity 121 may remain approximately constant as the fuel cavity 121 may be in communication with the atmosphere via the passage 158. Fuel may be therefore drawn to the intake passage 170 from the float bowl 119 via the central passage 141 according to this pressure differential. As fuel is drawn out of the fuel cavity 121, the float assembly 123 moves downwardly as does the distal end 161 of the lever arm 160. As distal end 161 moves downwardly, the fuel inlet valve 142 opens allowing additional fuel to be received within the float bowl 119.

FIG. 4 illustrates an optional fluid pump 2m having an outlet 14m in communication with the passage 158, rather than leaving passage 158 in direct or open communication with the atmosphere. The fluid pump 2m may be used as previously described to increase or decrease the pressure in the passage 158 and fuel cavity 121. In some instances, where a fluid (e.g., air) is pumped into the passage 158, the intake passage 170 may draw in a greater amount of fuel as the pressure differential between the fuel cavity 121 and the intake passage 170 increases. This may result in a richer fuel-air mixture being delivered to the engine via the intake passage 170. In other instances, a fluid may be pumped from the passage 158 using the fluid pump 2m; in these instances, the pressure in the fuel cavity may decrease. Where the pressure differential between the fuel cavity 121 and the intake passage 170 becomes less, the amount of fuel drawn into the intake passage 170 may decrease resulting in a leaner fuel-air mixture being delivered to the engine.

As previously described, the fluid pump 2m may be controlled by a controller 4 via a coupling 6. Other optional fluid pumps may be in communication with various other passages and chambers of the float bowl carburetor—either pumping a fluid therein or therefrom. For example, in FIG. 4, a fluid pump 2n may be in communication with the intake passage 170 to pump fuel or air into the intake passage. A pump 2p could similarly be communicated with the main fuel supply pipe 141 for a similar effect.

Figure 5:
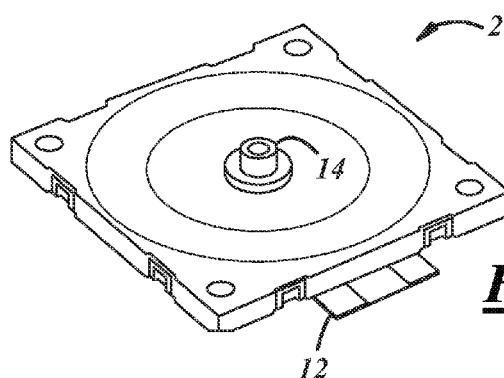
FIG. 5 is a perspective view of one implementation of a fluid pump.

In one implementation of the fluid pump 2, the pump may be a piezo-electric pump (or piezo-pump). FIG. 5 illustrates one example of a piezo-pump, such as the commercially available Murata Microblower MZB1001. The fluid pump 2 is shown having an electrical connector or interface 12 for the electrical coupling 6 and an orifice or outlet or port 14 for communicating with a fluid under pressure between the pump 2 and a chamber and/or passage of the carburetor 1.

The fluid pump may be capable of moving between 0.001 and 10 liters/minute (L/min) of fluid. In one exemplary implementation, the fluid pump may move 1.25 L/min. The flow rate may be controlled electronically by various means; and in one implementation, the flow rate may be variable according to an applied peak-to-peak voltage (Vpp) provided to the fluid pump. The flow rate to voltage may be a linear or nonlinear relationship. In one nonlinear embodiment, for example, a 10 Vpp may yield approximately 0.5 L/min, a 15 Vpp may yield approximately 1.0 L/min, and a 20 Vpp may yield approximately 1.25 Vpp. Where the fluid pump is miniaturized, the power consumption may be relatively small (e.g., less than 1 Watt, e.g., nominal power may be approximately 0.2 W). Minimal power consumption may be beneficial in capacitive discharge ignition (CDI) systems having strict electrical power budgets.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

Furthermore, spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device(s) in use or operation in addition to the orientation depicted in the figures. For example, if the device(s) in the figures is turned over, elements described as "below" or "beneath" other elements or features would then be oriented "above" the other elements or features. Thus, the exemplary term "below" can encompass both an orientation of above and below. The device(s) may be otherwise oriented (rotated 90 degrees or at other orientations) and the spatially relative descriptors used herein interpreted accordingly.

The invention claimed is:

1. An apparatus for delivering a fuel-air mixture to an operating engine, comprising:
    a carburetor having a fuel and air mixing passage for supplying a fuel and air mixture to an operating engine, a fuel metering system having a flexible diaphragm defining at least in part on one side a fuel metering chamber connected to and supplying fuel to the fuel and air mixing passage and on another side of the flexible diaphragm defining at least in part a reference chamber;

a piezo-electric fluid pump in fluid communication with one of the fuel metering chamber or the reference chamber and configured to change a fuel-to-air ratio of a fuel and air mixture delivered from the carburetor to the operating engine; and an electronic controller configured to determine an instantaneous fuel demand of the operating engine and to control operation of the piezo-electric fluid pump to change the fuel-to-air ratio of the fuel and air mixture supplied by the carburetor to the operating engine in response to the determined instantaneous fuel demand of the operating engine.

2. The apparatus of claim 1, which also comprises a fuel pump with a pump chamber in communication with the fuel metering chamber.

3. The apparatus of claim 2, wherein the fuel pump also comprises a pressure pulse chamber operable by changes in pressure in the pressure pulse chamber to supply fuel to the fuel metering chamber.

4. The apparatus of claim 1, wherein the fluid pump is a fuel pump in fluid communication with the fuel metering chamber and operable to change at least one of the volume, flow rate, or pressure of the fuel metering chamber.

5. The apparatus of claim 1, wherein the fluid pump is an air pump in fluid communication with the reference chamber and operable to change at least one of the volume or pressure of the reference chamber.

6. The apparatus of claim 4, which also comprises a gasoline fueled engine with a capacitive discharge ignition system which also powers the piezo-electric pump and the electronic controller.

7. The apparatus of claim 5, which also comprises a gasoline fueled engine with a capacitive discharge ignition system which also powers the piezo-electric pump and the electronic controller.

8. The apparatus of claim 1, wherein the fluid pump displaces a fluid from the fuel metering chamber or the fluid pump displaces a fluid to the fuel metering chamber and is operable to change at least one of the volume, flow rate, or pressure of the fuel metering chamber.

9. The apparatus of claim 1, wherein the piezo-electric pump is an air pump.

10. The apparatus of claim 1, wherein the piezo-electric pump is a fuel pump.

11. The apparatus of claim 1 which also comprises a general purpose gasoline fueled engine with a capacitive discharge ignition system which also powers the piezo-electric pump and the electronic controller.

12. A system for delivering a fuel-air mixture to an operating engine, comprising:

a carburetor having a fuel and air mixing passage for supplying a fuel and air mixture to an engine and a fuel chamber for supplying fuel to the fuel and air mixing passage;

a piezo-electric pump having a passage separate from the fuel chamber and directly communicating with the fuel and air mixing passage and configured to supply fluid to such fuel and air mixing passage to change the fuel-to-air ratio of the fuel and air mixture delivered from the carburetor to the operating engine; and an electronic controller configured to determine an instantaneous fuel demand of the operating engine and to control operation of the piezo-electric pump to change the fuel-to-air ratio of the fuel and air mixture supplied by the carburetor to the operating engine in response to the determined instantaneous fuel demand of the operating engine.

13. The system of claim 12 wherein the piezo-electric pump is an air pump.

14. The system of claim 12 wherein the piezo-electric pump is a fuel pump.

15. The system of claim 12 which also comprises a general purpose gasoline fueled engine with a capacitive discharge ignition system which also powers the piezo-electric pump and the electronic controller.

\* \* \* \* \*